(12) United States Patent
Heck et al.

(10) Patent No.: US 10,877,352 B2
(45) Date of Patent: Dec. 29, 2020

(54) SEMICONDUCTOR PHOTONIC DEVICES USING PHASE CHANGE MATERIALS

(71) Applicant: Intel Corporation, Santa Clara, CA (US)

(72) Inventors: John Heck, Berkeley, CA (US); Harel Frish, Qiryat Gat (IL); Derchang Kau, Cupertino, CA (US); Charles Dennison, San Jose, CA (US); Haisheng Rong, Pleasanton, CA (US); Jeffrey Driscoll, San Jose, CA (US); Jonathan K. Doylend, Morgan Hill, CA (US); George A. Ghiurcan, Corrales, NM (US); Michael E. Favaro, Edgewood, NM (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/517,315

(22) Filed: Jul. 19, 2019

(65) Prior Publication Data
US 2019/0339585 A1     Nov. 7, 2019

(51) Int. Cl.
*G02F 1/295*     (2006.01)

(52) U.S. Cl.
CPC ........ *G02F 1/295* (2013.01); *G02F 2201/066* (2013.01); *G02F 2201/12* (2013.01)

(58) Field of Classification Search
CPC ......... G02F 1/011; G02F 1/0147; G02F 1/295
See application file for complete search history.

(56) References Cited

U.S. PATENT DOCUMENTS

| | | | |
|---|---|---|---|
| 9,291,776 B2 * | 3/2016 | Svilans | .................... G02B 6/35 |
| 2019/0004342 A1 * | 1/2019 | Iida | ........................ G02F 1/0147 |

OTHER PUBLICATIONS

Jiajiu Zheng et al., "GST-on-silicon hybrid nanophotonic integrated circuits: a non-volatile quasi-continuously reprogrammable platform," Optical Materials Express, Jun. 1, 2018, vol. 8, No. 6, 11 pages.

* cited by examiner

*Primary Examiner* — Jennifer Doan
(74) *Attorney, Agent, or Firm* — Schwabe, Williamson & Wyatt, P.C.

(57) ABSTRACT

Embodiments include apparatuses, methods, and systems including a semiconductor photonic device having a substrate, a waveguide disposed above the substrate, a phase change layer disposed above the waveguide, and a heater disposed above the phase change layer. The waveguide has a modifiable refractive index based at least in part on a state of a phase change material included in the phase change layer. The phase change material of the phase change layer is in a first state of a set of states, and the waveguide has a first refractive index determined based on the first state of the phase change material. The heater is to generate heat to transform the phase change material to a second state of the set of states, and the waveguide has a second refractive index determined based on the second state of the phase change material. Other embodiments may also be described and claimed.

18 Claims, 5 Drawing Sheets

SEMICONDUCTOR PHOTONIC DEVICES USING PHASE CHANGE MATERIALS

FIELD

Embodiments of the present disclosure generally relate to the field of optoelectronics and, more particularly, to semiconductor photonic devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Growing demands for increasing optical bandwidth may require cost-effective circuits and systems solutions. One option for such cost-effective solutions may be the integration of photonic components on a single chip to form photonic integrated circuits (PICs). Many photonic devices require a way of adjusting the relative phase of light propagating in waveguides within the photonic devices. Current techniques for adjusting phases of photonic devices may have many problems. For example, active tuning of phases of a photonic device, e.g., using thermal heaters or pin diodes, draws power continuously throughout the device lifetime. Some other passive approaches may include trimming the devices, also known as post fabrication trimming (PFT), by thermally treating a material of the waveguide. These passive approaches are generally unreliable, costly, or hard to fabricate.

BRIEF DESCRIPTION OF THE DRAWINGS

Embodiments herein present techniques that will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments herein present an architecture and a fabrication process for a photonic tuning cell that can enable a class of photonic devices to be realized in production. Different from the continuous power consumption in the active tuning of phases of a photonic device, embodiments herein may have near zero power or low power tunability of photonic components. Furthermore, the low power tunability of photonic components enables the use of a backup device for redundancy. For example, in a device with many lasers, it may be desirable to maintain a backup laser for a channel in case the original laser fails. The use of a backup device for redundancy is practical due to the low power photonic tuning cell presented in embodiments herein. Hence, low power photonic tuning cells presented herein may be used in a wide variety of optical switching and routing applications.

In various embodiments, a semiconductor photonic device includes a substrate, a waveguide disposed above the substrate, a phase change layer disposed above the waveguide, and a heater disposed above the phase change layer. The waveguide has a refractive index that is modifiable based at least in part on a state of a phase change material included in the phase change layer. The phase change material of the phase change layer is in a first state of a set of states, and the waveguide has a first refractive index determined based on the first state of the phase change material. The heater is to generate heat to transform the phase change material to a second state of the set of states, and the waveguide has a second refractive index determined based on the second state of the phase change material.

In various embodiments, a method for forming a semiconductor photonic device includes forming a waveguide disposed above a substrate, and forming a phase change layer including a phase change material above the waveguide. The waveguide has a refractive index that is modifiable based at least in part on a state of the phase change material. The method further includes forming a heater above the phase change layer. The heater is to generate heat to transform the phase change material from a first state to a second state of a set of states. The waveguide has a first refractive index when the phase change material is in the first state, and has a second refractive index when the phase change material is in the second state. In embodiments, the first and second refractive indices can be different.

In various embodiments, an optical communication system includes at least one optical apparatus, and the optical apparatus includes a photonic tuning cell. The photonic tuning cell includes a substrate, a waveguide disposed above the substrate, a phase change layer disposed above the waveguide, and a heater disposed above the phase change layer. The waveguide has a refractive index that is modifiable based at least in part on a state of a phase change material included in the phase change layer. The phase change material of the phase change layer is in a first state of a set of states, and the waveguide has a first refractive index determined based on the first state of the phase change material. The heater is to generate heat to transform the phase change material to a second state of the set of states, and the waveguide has a second refractive index determined based on the second state of the phase change material.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Figure 1:
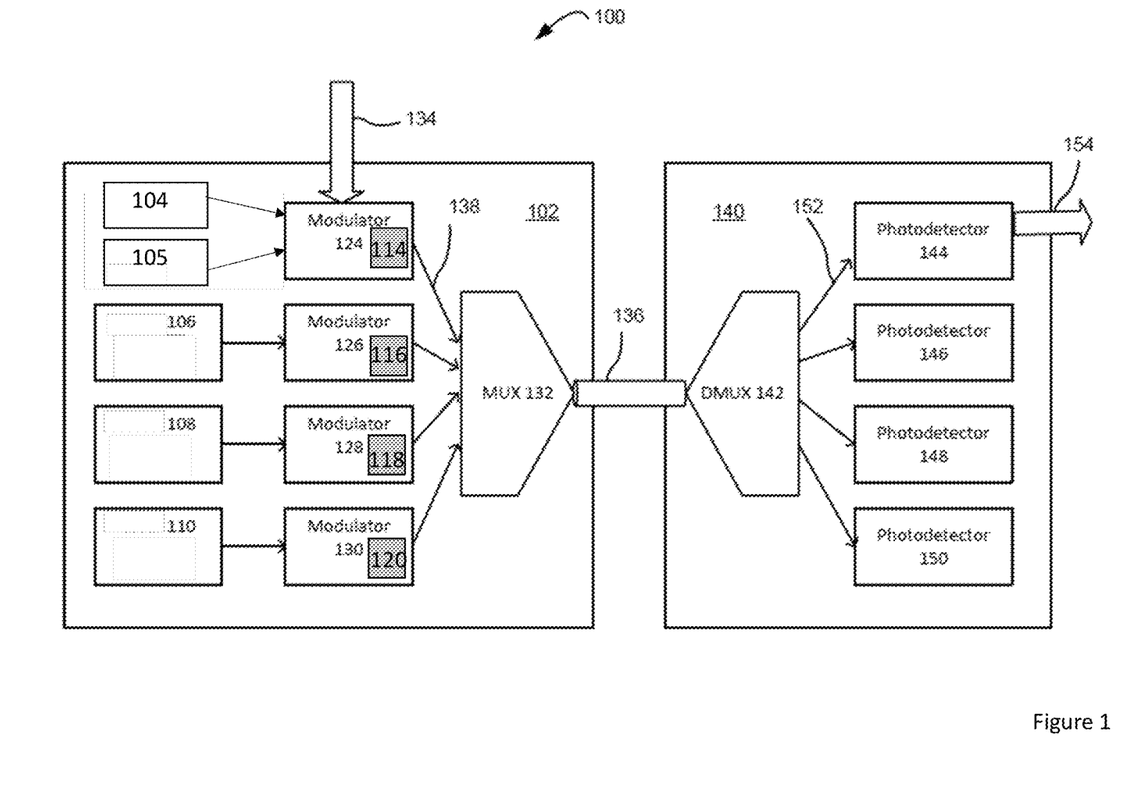
FIG. 1 schematically illustrates an example communication system that utilizes photonic tuning cells, according to various embodiments.

FIG. 1 schematically illustrates an example communication system 100 that utilizes photonic tuning cells, according to various embodiments. The system 100 includes a transmitter chip 102, configured to transmit data to a receiver chip 140. In embodiments, the transmitter chip 102 comprises a PIC within one or more optical modulators 124, 126, 128, 130 optically coupled with the laser devices 104, 105, 106, 108, 110 respectively. The optical modulators 124, 126, 128, 130 include photonic tuning cells 114, 116, 118, and 120, provided according to the designs shown in FIGS. 2(a)-2(e), in accordance with embodiments described herein. It will be understood that the number of on-chip laser devices may vary according to technological needs and constraints; the optical modulators 124, 126, 128, 130, the laser devices 104, 105, 106, 108, 110, and the photonic tuning cells 114, 116, 118, and 120 are shown for purposes of illustration.

In embodiments, the transmitter chip 102 further includes optical modulators 124, 126, 128, 130 optically coupled with the laser devices 104, 105, 106, 108, 110 respectively. The modulators 124, 126, 128, 130 may be a Mach-Zehnder interferometer (MZI) modulator or a ring modulator. The photonic tuning cells 114, 116, 118, and 120 may be located at an arm or both arms of the MZI modulator or any location of the ring modulators. The photonic tuning cells 114, 116, 118, and 120 consume low power, compared to active tuning of phases of a photonic device with thermal heaters or pin diodes drawing power continuously throughout the device lifetime. The laser devices 104 and 105 are both coupled to the modulator 124, where the laser device 105 may serve as a backup device for the laser device 104. For example, when the laser device 104 fails, operations may be switched to the laser device 105. The use of a backup device for redundancy is practical due to the low power photonic tuning cell 114 included in the modulator 124. Other modulators may be coupled to multiple laser devices as well, not shown.

The outputs of the modulators 124, 126, 128, 130 couple with a multiplexer (MUX) 132. It should be understood that the chip 102 (and receiver chip 140) may include other components (e.g., processors, memory, etc.) that are not shown herein for ease of explanation.

In operation, the optical signals provided by the laser devices 104, 105, 106, 108, 110 may be modulated with electronic data inputs, provided to the modulators (one of the electronic data inputs 134, provided to the modulator 124, is shown for purposes of clarity). The optical signals carrying the data information (e.g., 138) are multiplexed by the multiplexer 132 and the resulting data signal may be provided to an optical data communication channel 136 (e.g., optical fiber cable) for transmission. In embodiments, the length of the optical channel 136 may vary, e.g., from a few meters to a few kilometers.

On the receiver chip 140 side, the optical signal is de-multiplexed by the demultiplexer (DMUX) 142, and de-multiplexed optical data signals (e.g., 152) are provided to respective photodetectors 144, 146, 148, 150. The photodetectors 144, 146, 148, 150 may convert received optical data signals into an electronic form and provide resulting electronic data signals (e.g., 154) for further processing.

FIGS. 2(a)-2(e) schematically illustrate block diagrams of a photonic tuning cell, e. g., a photonic tuning cell 200, a photonic tuning cell 210, a photonic tuning cell 220, and a photonic tuning cell 230, according to various embodiments. In embodiments, the photonic tuning cell 200, the photonic tuning cell 210, the photonic tuning cell 220, and the photonic tuning cell 230 may be examples of the photonic tuning cells 114, 116, 118, and 120, as shown in FIG. 1, and perform similar functions respectively.

Figure 2A:
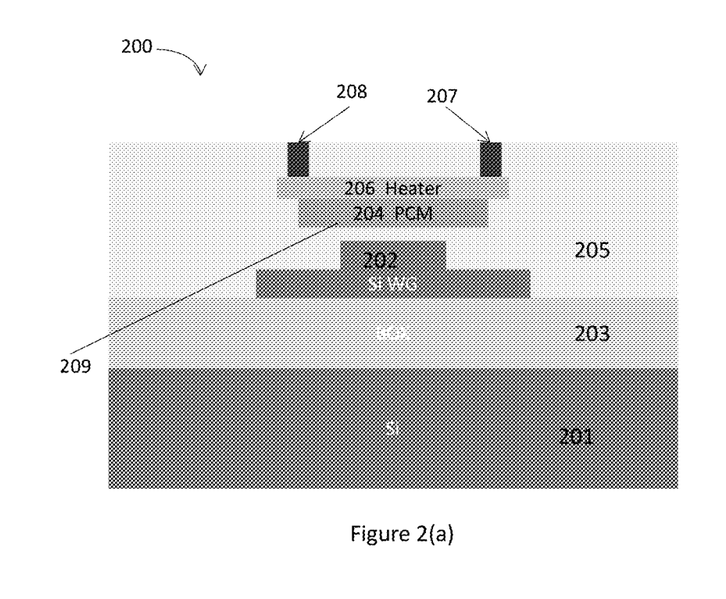
FIGS. 2(a)-2(e) schematically illustrate block diagrams of a photonic tuning cell, according to various embodiments.

In embodiments, as shown in FIG. 2(a), the photonic tuning cell 200 includes a substrate 201, a buried oxide layer 203 disposed above the substrate 201, a waveguide 202 disposed above the substrate 201 and above the buried oxide layer 203, a phase change layer 204 disposed above the waveguide 202, and a heater 206 disposed above the phase change layer 204. The photonic tuning cell 200 further includes one or more dielectric layers, e.g., an ILD layer 205, disposed to embed the waveguide 202, the phase change layer 204, and the heater 206. The buried oxide layer 203 is disposed between the substrate 201 and the waveguide 202. The photonic tuning cell 200 further includes a first electric contact 207 and a second electric contact 208 coupled to the heater 206.

In embodiments, the phase change layer 204 has a planar surface 209 towards the waveguide 202. As shown in FIG. 2(a), the waveguide 202 has a non-planar surface, while the phase change layer 204 has a planar surface, and does not follow the contour of the surface of the waveguide 202. The use of a planar surface for the phase change layer 204 improves the fabrication process, and make the photonic tuning cell 200 easier to be produced. Furthermore, the heater 206, the phase change layer 204, and the waveguide 202 are either in direct contact or separated by a dielectric material. As shown in FIG. 2(a), the heater 206 and the phase change layer 204 are in direct contact, and are both separated from the waveguide 202 by the ILD layer 205. As shown in FIG. 2(b)-2(e), other configurations for heater 206, the phase change layer 204, and the waveguide 202 are possible as well.

In embodiments, the phase change layer 204 includes a phase change material that can be in different states. For example, the phase change material includes a chalcogenide complex oxide film, Ge—Sb—Se—Te (GSST), germanium antimony telluride (GeSbTe), $Ge_1Sb_4Te_7$, $Ge_1Sb_2Te_4$, $Ge_2Sb_2Te_5$, $Ge_3Sb_2Te_6$, $(GeTe)_xSnSb_2Se_4$, or $Ge_2Sb_2Se_4Te_1$. The phase change material may be in a state of states including an amorphous state, a crystalline state, a cubic state, a hexagonal state, or one or more other intermediate states. The phase change material in the phase change layer 204 is transformed from a first state to a second state when the heater 206 is to generate heat to transform the states of the phase change material in the phase change layer 204. For example, the phase change layer 204 is to change states in response to an application of an electric current to the first electric contact 207 and the second electric contact 208 through the heater 206.

In embodiments, the waveguide 202 comprises a slab waveguide, a strip waveguide, a rib waveguide, or a surface ridge waveguide. The waveguide 202 includes Si or SiN. The waveguide 202 has a refractive index that is modifiable based at least in part on a state of a phase change material. When the phase change material of the phase change layer 204 is in a first state, the waveguide 202 has a first refractive index determined based on the first state of the phase change material. When the phase change material in the phase change layer 204 is changed to a second state, the waveguide 202 has a second refractive index determined based on the second state of the phase change material. The phase change material in the phase change layer 204 is transformed from the first state to the second state when the heater 206 is to generate heat to transform the states of the phase change material in the phase change layer 204.

In embodiments, the substrate 201 includes a silicon substrate, a glass substrate, a metal substrate, or a plastic substrate. The dielectric material in the ILD layer 205 includes silicon dioxide ($SiO_2$), carbon doped oxide (CDO), silicon nitride, perfluorocyclobutane, polytetrafluoroethylene, fluorosilicate glass (FSG), organic polymer, silsesquioxane, siloxane, or organosilicate glass. The heater 206 includes poly-Si, TiN, TaN, indium tin oxide (ITO), a transparent conductor, or an electrically resistive metal material. The first electric contact 207 or the second electric contact 208 includes a material selected from the group consisting of titanium (Ti), molybdenum (Mo), gold (Au), platinum (Pt), aluminum (Al), nickel (Ni), copper (Cu), chromium (Cr), hafnium (Hf), indium (In), and an alloy of Ti, Mo, Au, Pt, Al, Ni, Cu, Cr, TiAlN, HfAlN, or InAlO.

Figure 2B:
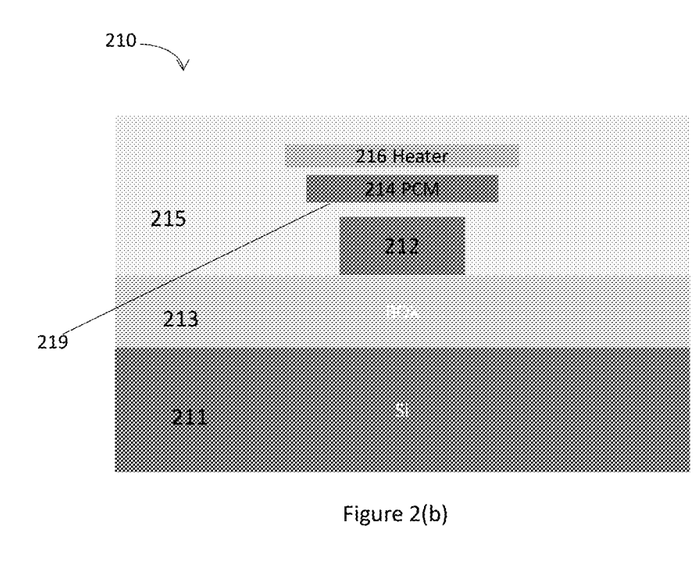

In embodiments, as shown in FIG. 2(b), the photonic tuning cell 210 includes a substrate 211, a buried oxide layer 213 disposed above the substrate 211, a waveguide 212 disposed above the substrate 211 and above the buried oxide layer 213, a phase change layer 214 disposed above the waveguide 212, and a heater 216 disposed above the phase change layer 214. The photonic tuning cell 210 further includes one or more dielectric layers, e.g., an ILD layer 215, disposed to embed the waveguide 212, the phase change layer 214, and the heater 216. The phase change layer 214 has a planar surface 219 towards the waveguide 212. The heater 216, the phase change layer 214, and the waveguide 202 are separated from each other by the ILD layer 215.

Figure 2C:
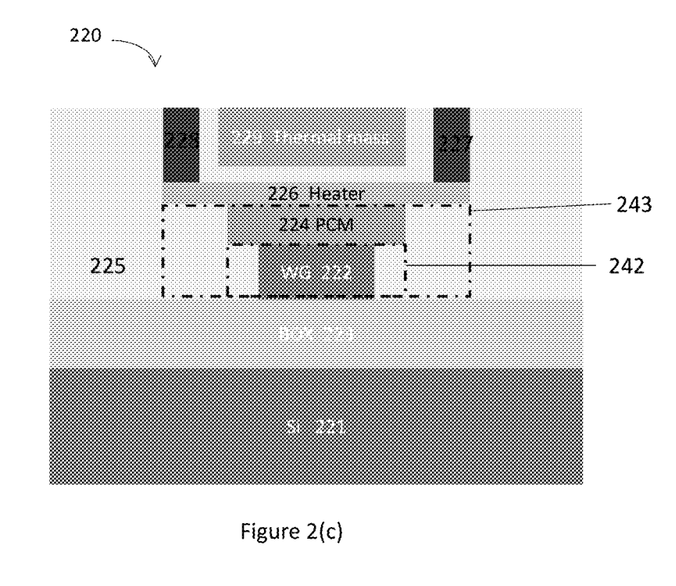
Figure 2D:
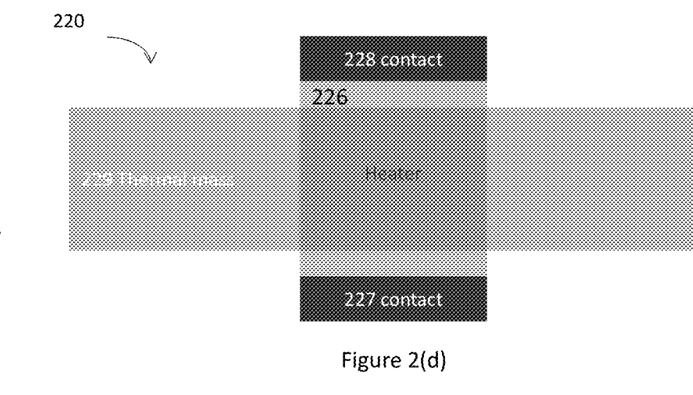

In embodiments, FIGS. 2(c)-2(d) show the photonic tuning cell 220 in cross-sectional view and in top down view respectively. In detail, the photonic tuning cell 220 includes a substrate 221, a buried oxide layer 223 disposed above the substrate 221, a waveguide 222 disposed above the substrate 221 and above the buried oxide layer 223, a phase change layer 224 disposed above the waveguide 222, and a heater 226 disposed above the phase change layer 224. The photonic tuning cell 220 further includes one or more dielectric layers, e.g., an ILD layer 225, disposed to embed the waveguide 222, the phase change layer 224, and the heater 226. The phase change layer 224 has a planar surface towards the waveguide 222. The photonic tuning cell 220 further includes a first electric contact 227 and a second electric contact 228 coupled to the heater 226. In addition, the photonic tuning cell 220 includes a thermal mass layer 229 disposed above the heater 226.

In embodiments, the heater 216, the phase change layer 214, and the waveguide 202 are in direct contact with each other, as shown in FIG. 2(c). Furthermore, the heater 226, the phase change layer 224, and the waveguide 222 form a reversed stair shape. In detail, the waveguide 222 is within a shadow of the phase change layer 224, and the phase change layer 224 is within a shadow of the heater 226. As shown in cross-sectional view, the heater 226, the phase change layer 224, and the waveguide 222 are of a rectangular shape. The waveguide 222 has a smaller width than the phase change layer 224, and the waveguide 222 is placed within a rectangle 242 extended from the phase change layer 224. Similarly, the phase change layer 224 has a smaller width than the heater 226, and the phase change layer 224 is placed within a rectangle 243 extended from the heater 226.

In embodiments, the thermal mass layer 229 is to increase an efficiency for the phase change material to change from the first state to the second state. The thermal mass layer 229 includes a glass, aluminum, wax, thermal salts, or a thermal mass material. In some embodiments, the thermal mass layer 229 includes a metal film, and has a thickness in a range of about 1 um to about 2 um, while the heater 226 has a thickness in a range of about 10 nm to about 50 nm.

Figure 2E:
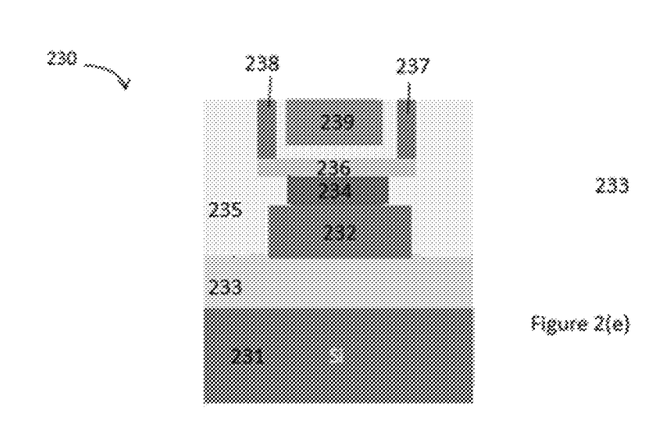

In embodiments, as shown in FIG. 2(e), the photonic tuning cell 230 includes a substrate 231, a buried oxide layer 233 disposed above the substrate 231, a waveguide 232 disposed above the substrate 231 and above the buried oxide layer 233, a phase change layer 234 disposed above the waveguide 232, and a heater 236 disposed above the phase change layer 234. The photonic tuning cell 230 further includes one or more dielectric layers, e.g., an ILD layer 235, disposed to embed the waveguide 232, the phase change layer 234, and the heater 236. The phase change layer 234 has a planar surface towards the waveguide 232. The photonic tuning cell 230 further includes a first electric contact 237 and a second electric contact 238 coupled to the heater 236. In addition, the photonic tuning cell 230 includes a thermal mass layer 239 disposed above the heater 226.

In embodiments, the heater 236, the phase change layer 234, and the waveguide 232 are in direct contact with each other. Furthermore, the heater 236, the phase change layer 234, and the waveguide 232 are of a rectangular shape. However, different from the photonic tuning cell 220 shown in FIG. 2(c), the waveguide 232 has a width larger than a width of the phase change layer 234. Similarly, the heater 236 also has a width larger than the width of the phase change layer 234. There may be many other configurations for the heater, the phase change layer, and the waveguide. The configurations shown in FIGS. 2(c) and 2(e) are for examples only, and are not limiting.

Figure 3:
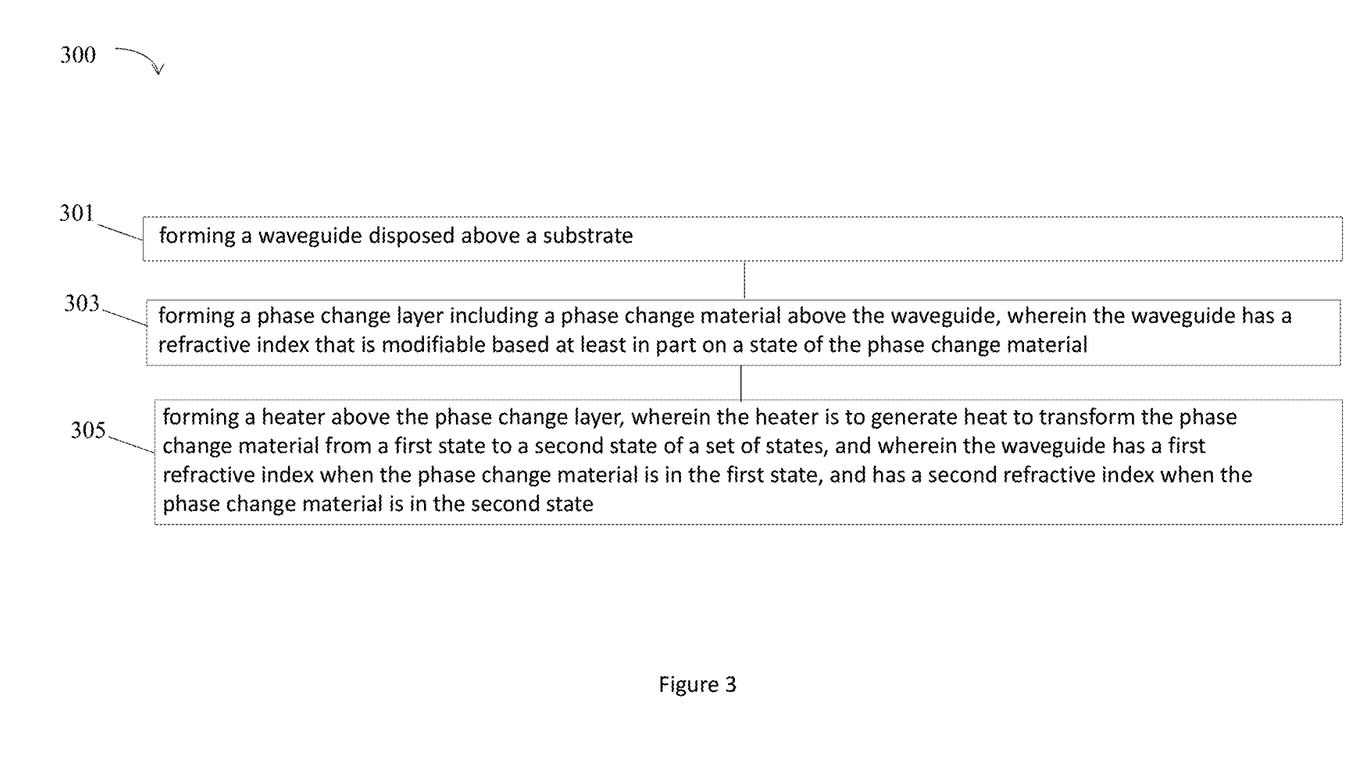
FIG. 3 schematically illustrates a flow diagram of a process for forming a photonic tuning cell, according to various embodiments.

FIG. 3 schematically illustrates a flow diagram of a process 300 for forming a photonic tuning cell, according to various embodiments. In embodiments, the process 300 may be performed to form the photonic tuning cells 114, 116, 118, and 120 as shown in FIG. 1, the photonic tuning cell 200, the photonic tuning cell 210, the photonic tuning cell 220, or the photonic tuning cell 230, as shown in FIGS. 2(a)-2(e).

At block 301, the process 300 includes forming a waveguide disposed above a substrate. For example, at the block 301, the process 300 may include forming the waveguide 202 disposed above the substrate 201, as shown in FIG. 2(a).

At block 303, the process 300 includes forming a phase change layer including a phase change material above the waveguide, where the waveguide has a refractive index that is modifiable based at least in part on a state of the phase change material. For example, at the block 303, the process 300 may include forming the phase change layer 204 including a phase change material above the waveguide 202. The waveguide 202 has a refractive index that is modifiable based at least in part on a state of the phase change material of the phase change layer 204, as shown in FIG. 2(a).

At block 305, the process 300 includes forming a heater above the phase change layer. The heater is to generate heat to transform the phase change material from a first state to a second state of a set of states. The waveguide has a first refractive index when the phase change material is in the first state, and has a second refractive index when the phase change material is in the second state. In embodiments, the first refractive index is different than the second refractive index. For example, at the block 305, the process 300 may include forming the heater 206 above the phase change layer 204, as shown in FIG. 2(a). The heater 206 is to generate heat to transform the phase change material from a first state to a second state of a set of states. The waveguide 202 has a first refractive index when the phase change material is in the first state, and has a second refractive index when the phase change material is in the second state.

In addition, the process 300 may further includes more operations for forming a first electric contact and a second electric contact coupled to the heater. The phase change layer is to change states in response to an application of an electric current to the first and second electric contacts through the heater. The process 300 also includes forming a thermal mass layer disposed above the heater, where the thermal mass layer is to increase an efficiency for the phase change material to change from the first state to the second state. Moreover, the process 300 includes forming one or more dielectric layers disposed to embed the waveguide, the phase change layer, and the heater, wherein the one or more dielectric layers include a dielectric material.

Figure 4:
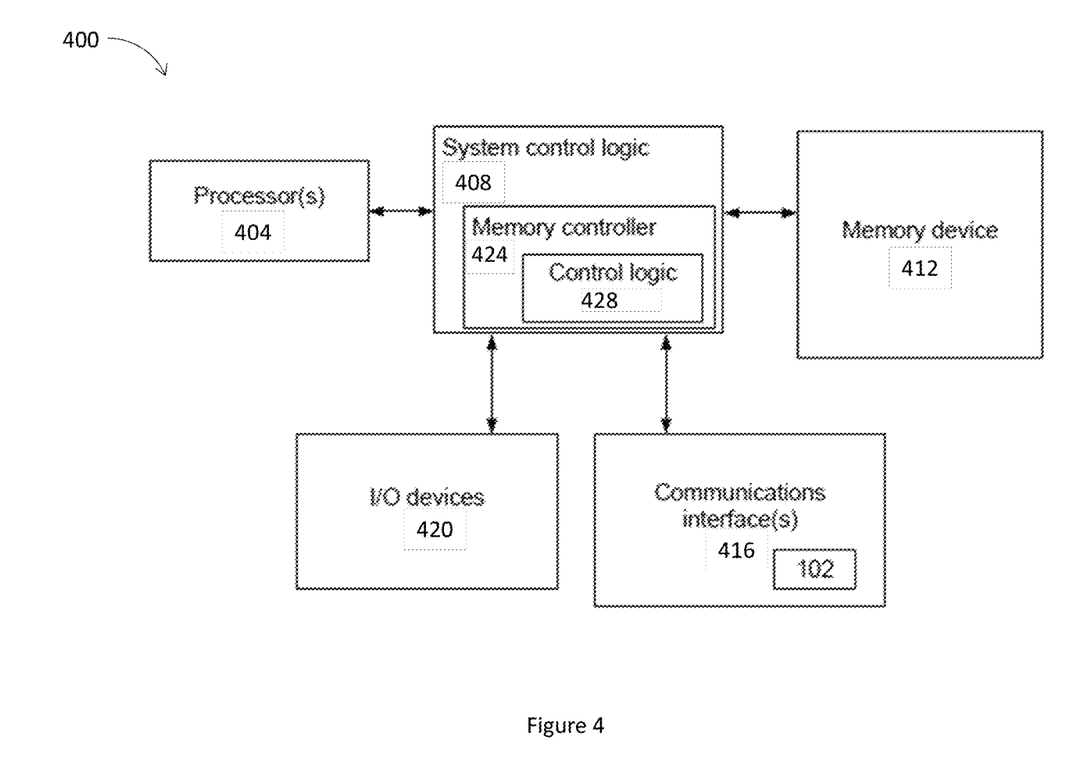
FIG. 4 schematically illustrates an exemplary computing and an optical device with a photonic tuning cell for use with various components and processes of FIGS. 1-3, according to various embodiments.

FIG. 4 schematically illustrates an exemplary computing and an optical device 400 with including a laser device for use with various components and processes of FIGS. 1-3, such as the photonic tuning cells 114, 116, 118, and 120 as shown in FIG. 1, the photonic tuning cell 200, the photonic tuning cell 210, the photonic tuning cell 220, the photonic tuning cell 230, as shown in FIGS. 2(a)-2(e), according to various embodiments.

The computing device 400 includes system control logic 408 coupled to one or more processor(s) 404; a memory device 412; one or more communications interface(s) 416; and input/output (I/O) devices 420. The memory device 412 may be a non-volatile computer storage chip (e.g., provided on the die). The memory device 412 may be configured to be removably or permanently coupled with the computing device 400.

Communications interface(s) 416 may provide an interface for computing device 400 to communicate over one or more network(s) and/or with any other suitable device. Communications interface(s) 416 may include any suitable hardware and/or firmware. Communications interface(s) 416 for one embodiment may include, for example, a network adapter, a wireless network adapter, a telephone modem, and/or a wireless modem. For wireless communications, communications interface(s) 416 for one embodiment may use one or more antennas to communicatively couple the computing device 400 with a wireless network. In embodiments, communication interface(s) 416 may include, or couple with, a transceiver, such as transmitter chip 102 of FIG. 1, including the photonic tuning cells 114, 116, 118, and 120, according to the embodiments described herein.

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

System control logic 408 for one embodiment may include any suitable interface controllers to provide for any suitable interface to at least one of the processor(s) 404 and/or to any suitable device or component in communication with system control logic 408. The system control logic 408 may move data into and/or out of the various components of the computing device 400.

System control logic 408 for one embodiment may include a memory controller 424 to provide an interface to the memory device 412 to control various memory access operations. The memory controller 424 may include control logic 428 that may be specifically configured to control access of the memory device 412.

In various embodiments, the I/O devices 420 may include user interfaces designed to enable user interaction with the computing device 400, peripheral component interfaces designed to enable peripheral component interaction with the computing device 400, and/or sensors designed to determine environmental conditions and/or location information related to the computing device 400. In various embodiments, the user interfaces could include, but are not limited to, a display, e.g., a liquid crystal display, a touch screen display, etc., a speaker, a microphone, one or more digital cameras to capture pictures and/or video, a flashlight (e.g., a light emitting diode flash), and a keyboard.

In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may additionally/alternatively be part of, or interact with, the communication interface(s) 416 to communicate with components of a positioning network, e.g., a global positioning system (GPS) satellite.

In various embodiments, the computing device 400 may be a mobile computing device such as, but not limited to, a laptop computing device, a tablet computing device, a netbook, a smartphone, etc.; a desktop computing device; a workstation; a server; etc. The computing device 400 may have more or fewer components, and/or different architectures. In further implementations, the computing device 400 may be any other electronic device that processes data.

EXAMPLES

Example 1 may include a semiconductor photonic device, comprising: a substrate; a waveguide disposed above the substrate, wherein the waveguide has a refractive index that is modifiable based at least in part on a state of a phase change material included in a phase change layer disposed above the waveguide; the phase change layer, wherein the phase change material of the phase change layer is in a first state of a set of states, and the waveguide has a first refractive index determined based on the first state of the phase change material; and a heater disposed above the phase change layer, wherein the heater is to generate heat to transform the phase change material to a second state of the set of states, and wherein the waveguide has a second refractive index determined based on the second state of the phase change material.

Example 2 may include the semiconductor photonic device of example 1 and/or some other examples herein, wherein the phase change layer has a planar surface towards the waveguide.

Example 3 may include the semiconductor photonic device of example 1 and/or some other examples herein, wherein the heater, the phase change layer, and the waveguide are either in direct contact or separated by a dielectric material.

Example 4 may include the semiconductor photonic device of example 1 and/or some other examples herein, wherein the heater, the phase change layer, and the waveguide form a reversed stair shape, wherein the waveguide is within a shadow of the phase change layer, and the phase change layer is within a shadow of the heater.

Example 5 may include the semiconductor photonic device of example 1 and/or some other examples herein, further comprising: a first electric contact and a second electric contact coupled to the heater, wherein the phase change layer is to change states in response to an application of an electric current to the first and second electric contacts through the heater.

Example 6 may include the semiconductor photonic device of example 5 and/or some other examples herein, wherein the first electric contact or the second electric contact includes a material selected from the group consisting of titanium (Ti), molybdenum (Mo), gold (Au), platinum (Pt), aluminum (Al), nickel (Ni), copper (Cu), chromium (Cr), hafnium (Hf), indium (In), and an alloy of Ti, Mo, Au, Pt, Al, Ni, Cu, Cr, TiAlN, HfAlN, or InAlO.

Example 7 may include the semiconductor photonic device of example 1 and/or some other examples herein, further comprising: a thermal mass layer disposed above the heater, wherein the thermal mass layer is to increase an efficiency for the phase change material to change from the first state to the second state, and wherein the thermal mass layer includes a glass, aluminum, wax, thermal salts, or a thermal mass material.

Example 8 may include the semiconductor photonic device of example 7 and/or some other examples herein, wherein the thermal mass layer includes a metal film, and has a thickness in a range of about 1 um to about 2 um, and wherein the heater has a thickness in a range of about 10 nm to about 50 nm.

Example 9 may include the semiconductor photonic device of example 1 and/or some other examples herein, further comprising: one or more dielectric layers disposed to embed the waveguide, the phase change layer, and the heater, wherein the one or more dielectric layers include a dielectric material.

Example 10 may include the semiconductor photonic device of example 9 and/or some other examples herein, wherein the dielectric material includes a material selected from the group consisting of silicon dioxide ($SiO_2$), carbon doped oxide (CDO), silicon nitride, perfluorocyclobutane, polytetrafluoroethylene, fluorosilicate glass (FSG), organic polymer, silsesquioxane, siloxane, and organosilicate glass.

Example 11 may include the semiconductor photonic device of example 1 and/or some other examples herein, wherein the phase change material includes a material selected from a chalcogenide complex oxide film, Ge—Sb—Se—Te (GSST), germanium antimony telluride (GeSbTe), $Ge_1Sb_4Te_7$, $Ge_1Sb_2Te_4$, $Ge_2Sb_2Te_5$, $Ge_3Sb_2Te_6$, $(GeTe)_xSnSb_2Se_4$, or $Ge_2Sb_2Se_4Te_1$.

Example 12 may include the semiconductor photonic device of example 1 and/or some other examples herein, wherein the set of states of the phase change material includes an amorphous state, a crystalline state, a cubic state, a hexagonal state, or one or more other intermediate states.

Example 13 may include the semiconductor photonic device of example 1 and/or some other examples herein, wherein the heater includes poly-Si, TiN, TaN, indium tin oxide (ITO), a transparent conductor, or an electrically resistive metal material.

Example 14 may include the semiconductor photonic device of example 1 and/or some other examples herein, wherein the waveguide comprises a slab waveguide, a strip waveguide, a rib waveguide, or a surface ridge waveguide, and the waveguide includes Si or SiN.

Example 15 may include the semiconductor photonic device of example 1 and/or some other examples herein, further comprising: a buried oxide layer disposed between the substrate and the waveguide.

Example 16 may include the semiconductor photonic device of example 1 and/or some other examples herein, wherein the substrate includes a material selected from the group consisting of a silicon substrate, a glass substrate, a metal substrate, and a plastic substrate.

Example 17 may include a method for forming a semiconductor photonic device, comprising: forming a waveguide disposed above a substrate; forming a phase change layer including a phase change material above the waveguide, wherein the waveguide has a refractive index that is modifiable based at least in part on a state of the phase change material; and forming a heater above the phase change layer, wherein the heater is to generate heat to transform the phase change material from a first state to a second state of a set of states, and wherein the waveguide has a first refractive index when the phase change material is in the first state, and has a second refractive index when the phase change material is in the second state.

Example 18 may include the method of example 17 and/or some other examples herein, wherein the phase change layer has a planar surface towards the waveguide.

Example 19 may include the method of example 17 and/or some other examples herein, further comprising: forming a first electric contact and a second electric contact coupled to the heater, wherein the phase change layer is to change states in response to an application of an electric current to the first and second electric contacts through the heater.

Example 20 may include the method of example 17 and/or some other examples herein, further comprising: forming a thermal mass layer disposed above the heater, wherein the thermal mass layer is to increase an efficiency for the phase change material to change from the first state to the second state, and wherein the thermal mass layer includes a glass, aluminum, wax, thermal salts, or a thermal mass material.

These modifications may be made to the disclosure in light of the above detailed description. The terms used in the following claims should not be construed to limit the disclosure to the specific implementation disclosed in the specification and the claims. Rather, the scope of the disclosure is to be determined entirely by the following claims, which are to be construed in accordance with established doctrines of claim interpretation.

What is claimed is:

1. A semiconductor photonic device, comprising:
a substrate;
a waveguide disposed above the substrate, wherein the waveguide has a refractive index that is modifiable based at least in part on a state of a phase change material included in a phase change layer disposed above the waveguide;
the phase change layer, wherein the phase change material of the phase change layer is in a first state of a set of states, and the waveguide has a first refractive index determined based on the first state of the phase change material;
a heater disposed above the phase change layer, wherein the heater k to generate heat to transform the phase change material to a second state of the set of states, and wherein the waveguide has a second refractive index determined based on the second state of the phase change material; and
further comprising a thermal mass layer disposed above the heater, wherein the thermal mass layer is to increase an efficiency for the phase change material to change from the first state to the second state, and wherein the thermal mass layer includes glass, aluminum, wax, thermal salts, or a thermal mass material.

2. The semiconductor photonic device of claim 1, wherein the phase change layer has a planar surface towards the waveguide.

3. The semiconductor photonic device of claim 1, wherein the heater, the phase change layer, and the waveguide are either in direct contact or separated by a dielectric material.

4. The semiconductor photonic device of claim 1, wherein the heater, the phase change layer, and the waveguide form a reversed stair shape, wherein the waveguide is within a shadow of the phase change layer, and the phase change layer is within a shadow of the heater.

5. The semiconductor photonic device of claim 1, further comprising:
a first electric contact and a second electric contact coupled to the heater, wherein the phase change layer is to change states in response to an application of an electric current to the first and second electric contacts through the heater.

6. The semiconductor photonic device of claim 5, wherein the first electric contact or the second electric contact includes a material selected from a group consisting of titanium (Ti), molybdenum (Mo), gold (Au), platinum (Pt), aluminum (Al), nickel (Ni), copper (Cu), chromium (Cr), hafnium (Hf), indium (In), and an alloy of Ti, Mo, Au, Pt, Al, Ni, Cu, Cr, TiAlN, HfAlN, or InAlO.

7. The semiconductor photonic device of claim 1, wherein the thermal mass layer includes a metal film, and has a thickness in a range of about 1 um to about 2 um, and wherein the heater has a thickness in a range of about 10 nm to about 50 nm.

8. The semiconductor photonic device of claim 1, further comprising:
one or more dielectric layers disposed to embed the waveguide, the phase change layer, and the heater, wherein the one or more dielectric layers include a dielectric material.

9. The semiconductor photonic device of claim 8, wherein the dielectric material includes a material selected from a group consisting of silicon dioxide ($SiO2$), carbon doped oxide (CDO), silicon nitride, perfluorocyclobutane, polytetrafluoroethylene, fluorosilicate glass (FSG), organic polymer, silsesquioxane, siloxane, and organosilicate glass.

10. The semiconductor photonic device of claim 1, wherein the phase change material includes a material selected from a chalcogenide complex oxide film, Ge—Sb—Se—Te (GSST), germanium antimony telluride (GeSbTe), $Ge_1Sb_4Te_7$, $Ge_1Sb_2Te_4$, $Ge_2Sb_2Te_5$, $Ge_3Sb_2Te_6$, $(GeTe)_xSnSb_2Se_4$, or $Ge_2Sb_2Se_4Te_1$.

11. The semiconductor photonic device of claim 1, wherein the set of states of the phase change material includes an amorphous state, a crystalline state, a cubic state, a hexagonal state, or one or more other intermediate states.

12. The semiconductor photonic device of claim 1, wherein the heater includes poly-Si, TiN, TaN, indium tin oxide (ITO), a transparent conductor, or an electrically resistive metal material.

13. The semiconductor photonic device of claim 1, wherein the waveguide comprises a slab waveguide, a strip waveguide, a rib waveguide, or a surface ridge waveguide, and the waveguide includes Si or SiN.

14. The semiconductor photonic device of claim 1, further comprising:

a buried oxide layer disposed between the substrate and the waveguide.

15. The semiconductor device of claim 1, wherein the substrate includes a material selected from a group consisting of a silicon substrate, a glass substrate, a metal substrate, and a plastic substrate.

16. A method for forming a semiconductor photonic device, comprising:
   forming a waveguide disposed above a substrate;
   forming a phase change layer including a phase change material above the waveguide, wherein the waveguide has a refractive index that is modifiable based at least in part on a state of the phase change material;
   forming a heater above the phase change layer, wherein the heater is to generate heat to transform the phase change material from a first state to a second state of a set of states, and wherein the waveguide has a first refractive index when the phase change material is in the first state, and has a second refractive index when the phase change material is in the second state; and
   forming a thermal mass layer disposed above the heater, wherein the thermal mass layer is to increase an efficiency for the phase change material to change from the first state to the second state, and wherein the thermal mass layer includes glass, aluminum, wax, thermal salts, or a thermal mass material.

17. The method of claim 16, wherein the phase change layer has a planar surface towards the waveguide.

18. The method of claim 16, further comprising:
   forming a first electric contact and a second electric contact coupled to the heater, wherein the phase change layer is to change states in response to an application of an electric current to the first and second electric contacts through the heater.

* * * * *

UNITED STATES PATENT AND TRADEMARK OFFICE
CERTIFICATE OF CORRECTION

PATENT NO. : 10,877,352 B2
APPLICATION NO. : 16/517315
DATED : December 29, 2020
INVENTOR(S) : John Heck et al.

It is certified that error appears in the above-identified patent and that said Letters Patent is hereby corrected as shown below:

In the Claims

Column 11
Line 61, "... heater k to" should read -- ... heater is to --

Signed and Sealed this
Thirtieth Day of August, 2022

Katherine Kelly Vidal
*Director of the United States Patent and Trademark Office*